United States Patent
Ono et al.

(10) Patent No.: US 8,663,858 B2
(45) Date of Patent: Mar. 4, 2014

(54) FUEL CELL SYSTEM AND METHOD FOR OPERATING THE SAME

(75) Inventors: Yoshitaka Ono, Yokosuka (JP); Takahiro Fujii, Miura (JP); Takashi Iimori, Tokyo (JP); Akira Matsunaga, Yokohama (JP); Ryoichi Shimoi, Yokohama (JP); Kazuo Saito, Yokohama (JP); Hitoshi Igarashi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 785 days.

(21) Appl. No.: 12/529,798

(22) PCT Filed: Jun. 18, 2008

(86) PCT No.: PCT/IB2008/001586
§ 371 (c)(1),
(2), (4) Date: Apr. 29, 2010

(87) PCT Pub. No.: WO2008/155629
PCT Pub. Date: Dec. 24, 2008

(65) Prior Publication Data
US 2010/0203408 A1   Aug. 12, 2010

(30) Foreign Application Priority Data

Jun. 20, 2007 (JP) ................................. 2007-162909
Feb. 22, 2008 (JP) ................................. 2008-041828

(51) Int. Cl.
*H01M 8/04* (2006.01)

(52) U.S. Cl.
USPC ..................... 429/428; 429/429; 180/65.285

(58) Field of Classification Search
USPC .......................... 429/428–451; 180/65.1–65.8
See application file for complete search history.

(56) References Cited

U.S. PATENT DOCUMENTS

| | | | |
|---|---|---|---|
| 2001/0053950 A1* | 12/2001 | Hasegawa et al. | 701/22 |
| 2003/0152816 A1* | 8/2003 | Hoch | 429/13 |
| 2003/0224228 A1* | 12/2003 | Reiser et al. | 429/13 |
| 2004/0137291 A1* | 7/2004 | Smedley et al. | 429/22 |
| 2006/0188765 A1* | 8/2006 | Matsuzaki et al. | 429/23 |

FOREIGN PATENT DOCUMENTS

| | | |
|---|---|---|
| DE | 10 2005 042 722 | 8/2006 |
| JP | 2001-359204 | 12/2001 |
| JP | 2006-294304 | 10/2006 |
| WO | WO 2006/117969 | 11/2006 |
| WO | WO 2006117969 A1 * | 11/2006 |

* cited by examiner

*Primary Examiner* — Basia Ridley
*Assistant Examiner* — James Erwin
(74) *Attorney, Agent, or Firm* — Drinker Biddle & Reath LLP

(57) ABSTRACT

A fuel cell system which prevents the deterioration of the fuel cell stack when feeding of the oxidant gas is paused under a load to perform a fuel conservation operation. Controller shuts down oxidant gas compressor and cooling water circulating pump to execute fuel conservation operation at a low fuel cell system load. The controller gives a current draw instruction to electric power controller. In the fuel conservation operation, electric power controller draws a current larger than zero from fuel cell stack, and keeps the total charge drawn per unit time constant or substantially constant.

17 Claims, 12 Drawing Sheets

FUEL CELL SYSTEM AND METHOD FOR OPERATING THE SAME

CROSS-REFERENCE TO RELATED APPLICATIONS

This application claims priority to Japanese Patent Application No. 2007-162909, filed Jun. 20, 2007 and to Japanese Patent Application No. 2008-041828, filed Feb. 22, 2008, the entire contents of which are incorporated by reference herein.

BACKGROUND OF THE INVENTION

1. Field of the Invention

The present invention relates generally to a type of fuel cell system. More particularly, the present invention relates to a type of fuel cell system that temporarily shuts down power generation under a low load.

2. Description of the Related Art

In a vehicle carrying a conventional fuel cell system, when all of the following conditions are met, that is, when the vehicle speed is lower than a prescribed speed, the output power of the motor for traveling and the output power of the motor for driving the air compressor for driving the fuel cell are lower than respective prescribed motor output powers, the brake is ON, and the voltage between terminals of the accumulator is higher than a prescribed voltage, then feeding of the reaction gases to the fuel cell is stopped, and power generation of the fuel cell is temporarily shut down. That is, an idle stop operation is performed.

Japanese Kokai Patent Application No. 2001-359204 discloses this type of conventional fuel cell system. However, the fuel cell of this type can experience problems relating to the durability of the solid-state polymer fuel cell. That is, when power generation of the fuel cell is shut down, the voltage of the fuel cell stack rises, and the fuel cell stack deteriorates. This phenomenon is considered undesirable.

SUMMARY OF THE INVENTION

Embodiments of the present invention can avoid the problems associated with the conventional fuel cell system discussed above. For example, and embodiment of the present invention provides a fuel cell system comprising a fuel cell stack that generates power by electrochemical reaction of the reaction gases fed to the fuel electrode and the oxidant electrode. In this type of fuel cell system, when the load demand on the fuel cell stack becomes lower than a prescribed level, at least the reaction gas feeding device is shut down to conserve fuel in a fuel conservation operation. Also, a controller operates such that during the fuel conservation operation, a current larger than zero is drawn from the fuel cell stack, and the total charge drawn per unit time has a constant or substantially constant value.

In addition, in this type of fuel cell system, a current larger than zero is drawn from the fuel cell stack during the fuel conservation operation, and the drawn charge per unit time remains at a constant or substantially constant value. Hence, even when the fuel cell stack deteriorates over time, it is still possible to limit deterioration from increased voltage of the fuel cell stack during the fuel conservation operation.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

Figure 1:
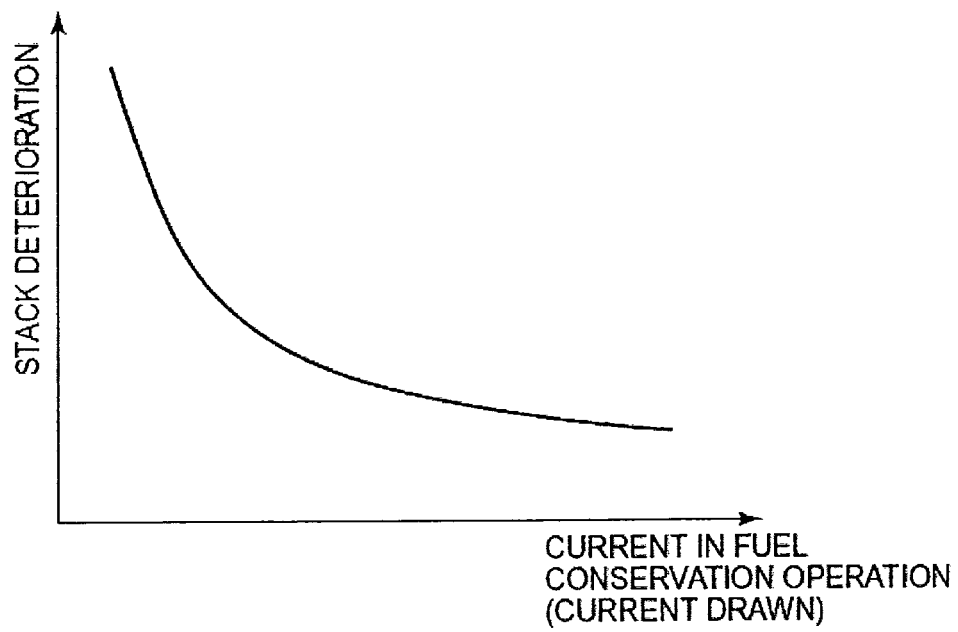
FIG. 1 is a diagram illustrating an example of the relationship between the current during fuel conservation operation and stack deterioration.

Embodiments of the present invention will now be described with reference to the drawings. In the drawings, common or similar parts are assigned the same or similar reference numerals.

Before explaining the embodiments, an example of fuel cell deterioration will be explained. The mechanism of deterioration of the electrolyte membrane due to maintaining the fuel cell voltage close to the open circuit voltage can occur as follows. Due to the 2-electron reaction of oxygen reduction indicated by the chemical equation (Equation 1) on the catalyst of the fuel electrode and oxidant electrode, hydrogen peroxide is formed.

$$O_2 + 2H^+ + 2e^- \rightarrow H_2O_2 \qquad \text{(Equation 1)}$$

As a result, very highly oxidative OH radicals are generated, and the molecular structure of the electrolyte membrane becomes damaged.

However, deterioration in the fuel cell stack due to a rise in the fuel cell stack voltage and the maintenance of a voltage close to the open circuit voltage can be significantly suppressed by drawing a minute current from the fuel cell stack. As shown in FIG. 1, in this case, the relationship between the magnitude of the current drawn and the degree of deterioration is such that the degree of deterioration decreases as the current drawn rises. Also, the proportion falls when the current drawn increases.

To achieve these results, the current of the fuel cell stack can be controlled, or the voltage of the fuel cell stack can be controlled.

In one embodiment of the present invention, when the fuel cell stack has deteriorated from its new state, a current larger than zero is drawn from the fuel cell stack during a fuel conservation operation, and the total charge drawn per unit time is constant or substantially constant. As a result, although the current-voltage characteristics vary during the process of using the fuel cell stack, it is still possible to prevent deterioration in fuel cell stack performance efficiently.

In addition, by controlling the value of the current drawn from the fuel cell stack to keep it constant or substantially constant, even during a fuel conservation operation when feeding of the reaction gases is stopped, it is still possible to control the gas consumption in the fuel cell stack and feed gas pipeline. As a result, there is little or no wasteful gas consumption from beginning to end of the fuel conservation operation, and it is possible to perform the fuel conservation operation over a long period of time. Consequently, it is possible to suppress deterioration of the fuel cell system in the vehicle during the fuel conservation operation, and it is possible to increase the cruising distance of the vehicle.

First Embodiment

Figure 2:
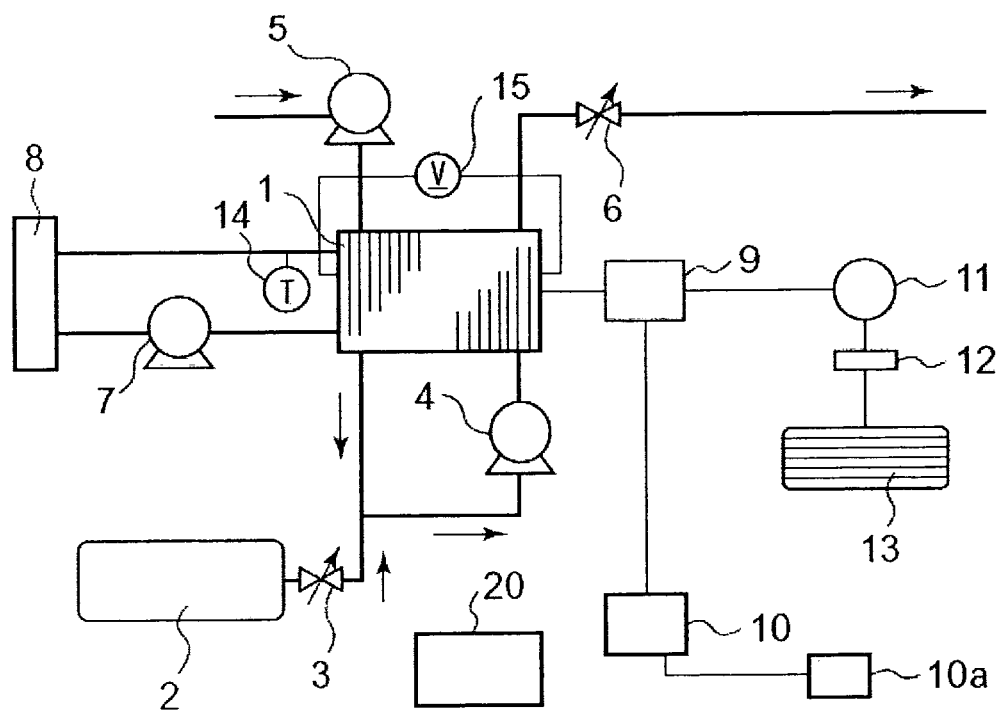
FIG. 2 is a diagram illustrating an example of the constitution of the main portion of the fuel cell vehicle employing a fuel cell system according to a first embodiment of the present invention.

A first embodiment of the fuel cell system in accordance with the present invention will now be explained. FIG. 2 is a diagram illustrating an example of the main portion of the fuel cell vehicle carrying the fuel cell system according to this embodiment of the present invention. As shown in FIG. 2, fuel cell stack 1 is a laminate prepared by laminating plural solid-state polymer fuel cells. Fuel tank 2 stores hydrogen gas at high pressure as the fuel gas. Fuel pressure adjusting valve 3 reduces the high pressure of the hydrogen gas in fuel tank 2, whereupon the hydrogen gas is fed to fuel cell stack 1. Fuel gas circulating pump 4 mixes the fuel gas fed from fuel pressure adjusting valve 3 and the fuel gas exiting fuel cell stack 1, and feeds the mixture to fuel cell stack 1. Oxidant gas compressor 5 compresses air as the oxidant gas and feeds it to fuel cell stack 1. The air used in fuel cell stack 1 is released via oxidant gas pressure adjusting valve 6.

Cooling water circulating pump 7 circulates the cooling water between cooling water path (not shown in the figure) formed inside fuel cell stack 1 and radiator 8. The reaction heat generated by fuel cell stack 1 is dissipated from radiator 8. Temperature sensor 14 that detects the temperature of fuel cell stack 1 (e.g., fuel cell stack temperature detecting means) is arranged at the cooling water outlet of fuel cell stack 1. The temperature sensor 14 may be a sensor that can directly detect the internal temperature of fuel cell stack 1. It should be noted that in the first through third embodiments described herein, temperature sensor 14 is not required.

Electric power controller 9 controls discharge from rechargeable battery 10 when the electric power generated by fuel cell stack 1 is insufficient. Also, electric power controller 9 controls charging of the rechargeable battery 10 such that while rechargeable battery 10 is charged when there is excess electric power generated by fuel cell stack 1, rechargeable battery 10 is also charged by regenerated electric power produced by driving motor 11. Also, electric power controller 9 contains a resistor for discharge (e.g., a discharge means) that can be connected in parallel with fuel cell stack 1. The electric power generated by fuel cell stack 1 can be discharged via the resistor while rechargeable battery 10 is being charged with regenerated electric power. Also, the resistor for discharge may be arranged outside of electric power controller 9. Rechargeable battery residual charge monitor 10a detects the remaining charge in rechargeable battery 10.

Driving motor 11 is driven by the electric power generated by fuel cell stack 1 and the electric power discharge of rechargeable battery 10. When the vehicle is decelerated, driving motor 11 regenerates the kinetic energy of the vehicle as electric power that is fed to electric power controller 9. The electric power controller 9 rectifies the regenerated electric power and adjusts its voltage, so that charging of rechargeable battery 10 can be performed. That is, driving motor 11 and electric power controller 9 operate as means for energy regeneration. Vehicle speed sensor 12 detects the vehicle speed. Driving wheels 13 are driven to rotate by driving motor 11 in order to drive the fuel cell vehicle. Voltage sensor 15 detects the voltage of fuel cell stack 1 and the voltages of the various cells that comprise fuel cell stack 1 or the cell group comprising plural cells connected in series, and sends the detected value to controller 20.

The controller 20 performs control of the supply of reaction gases in the fuel cell system and control of the overall system, such as control of the temperature of fuel cell stack 1. The fuel cell vehicle is also controlled, and when the load demanded from fuel cell stack 1 falls below a prescribed level, at least oxidant gas compressor 5 is shut down to implement the fuel conservation operation. The controller causes a current larger than zero to be drawn from fuel cell stack 1 during the fuel conservation operation, and the total charge drawn per unit time is controlled to be constant or substantially constant.

Although not required, in this example controller 20 comprises a microprocessor comprising a CPU, a program ROM, a working RAM, and an input/output interface. Control is realized by execution of the control program stored in the program ROM by the CPU.

The following are examples of the conditions under which fuel conservation operation of the fuel cell vehicle shown in FIG. 2 is allowed.

(1) When the electric energy required by the vehicle is lower than a prescribed level for a prescribed time (for example, 20 sec). For example, when the vehicle speed detected by vehicle speed sensor 12 is lower than a prescribed speed (for example, 10 km/h), or when the load required by the driver of the vehicle continues to be lower than a prescribed load for a prescribed time according to the accelerator pedal depression distance, such as when the vehicle is running down a continuous slope.

(2) When there is no electric power consumption by the air conditioner.

(3) When the residual charge of rechargeable battery 10 detected by residual charge monitor 10a exceeds a prescribed level (such as 60% of the maximum capacity).

When all of the above-listed conditions (1), (2), (3) are met, controller 20 sets fuel conservation operation permission flag Fs to 1 for making the transition of the fuel cell system to fuel conservation operation.

In fuel conservation operation, for example, while controller 20 controls the fuel gas fed by fuel gas circulating pump 4 to flow at a prescribed rate (such as 80% of the flow rate in idle operation) to fuel cell stack 1, oxidant gas compressor 5 that feeds the oxidant gas and cooling water circulating pump 7 are shut down. As a result, it is possible to significantly reduce the electric power consumption relative to that in idle operation (such as when fuel conservation operation permission flag is set to 1), and it is possible to realize fuel conservation for the fuel cell system.

Figure 3A:
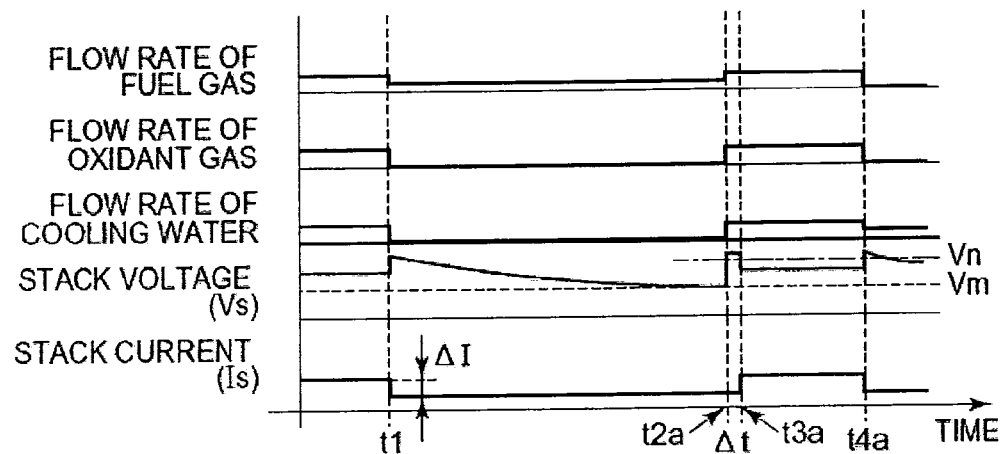
FIG. 3A is a timing chart illustrating an example of the various control values in the fuel conservation operation cycle in accordance with the first embodiment of the present invention.

FIG. 3A is a time chart illustrating an example of the various control values of the fuel gas flow rate, oxidant gas flow rate, cooling water flow rate, stack voltage, and stack current when the fuel conservation operation cycle is continued. In the fuel conservation operation cycle, during fuel conservation operation, the fuel cell stack voltage falls and fuel conservation operation is paused, and after the oxidant gas and cooling water are fed to the fuel cell stack, the operation is again reset to the fuel conservation operation.

In FIG. 3A, when fuel conservation operation is started at time t1, the flow rate of the fuel gas is significantly reduced from that in the idle operation immediately before the fuel conservation operation. At the same time, the flow rate of the oxidant gas and the flow rate of the cooling water become 0. After time t1, the value of the current drawn from fuel cell stack 1 is not 0, and has a positive value. Also, electric power controller 9 performs controlling operations so that the total charge drawn per unit time becomes constant or substantially constant. With the integrated value of the current per unit time constant or substantially constant, the current value may have a sinusoidal waveform, and there may be variation in the minimum control error and current of electric power controller 9. However, it is necessary to ensure that the current value is not zero.

According to this first embodiment, the auxiliary devices for operation of fuel cell stack 1, such as oxidant gas compressor 5 and cooling water circulating pump 7, are shut down beginning at time t1. Also, the current drawn from fuel cell stack 1 is reduced relative to that in idle operation by a quantity corresponding to the electric power consumed by the auxiliary devices ($\Delta I$).

The oxidant gas is then consumed over time, and the voltage of fuel cell stack 1 gradually falls. In order to improve the response when resetting from fuel conservation operation to normal operation, when the voltage of fuel cell stack 1 has fallen to a prescribed voltage (for example, to a Vm of 0.75 V for each cell), the operation is reset to conventional idle operation (time t2a). More particularly, after the fuel gas and the oxidant gas are fed at the preset gas flow rates for idle operation, or at gas flow rates increased by a prescribed ratio (for example, double the preset flow rates) in order to reset in a shorter time, a transition is made in a prescribed time (for example, time $\Delta t$ from time t2a to time t3a being 1 sec) to the fuel cell stack current in idle operation, and the operating mode is reset to conventional idle operation.

In addition, when the state in which the electric power required by the vehicle is below a prescribed level lasts for a prescribed time (for example, 20 sec) to time t4a, fuel conservation operation is repeated as described above.

Figure 3B:
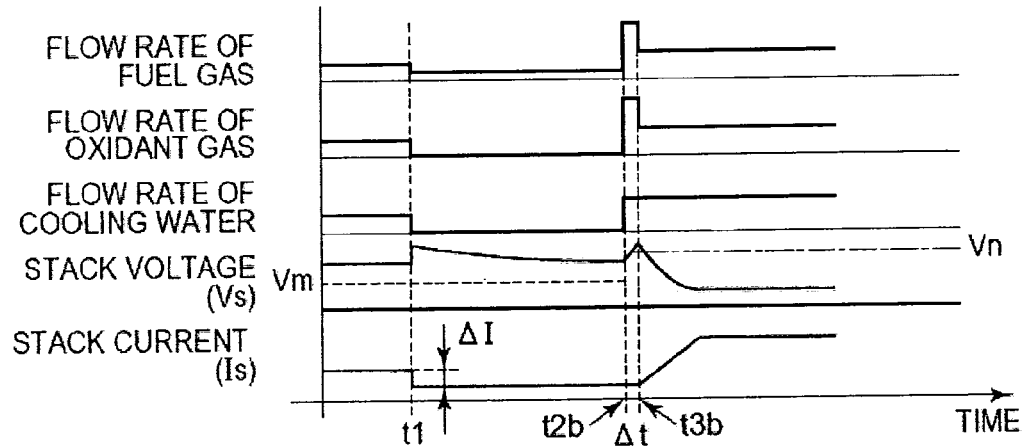
FIG. 3B is a timing chart illustrating an example of the various control values in resetting from fuel conservation operation to a normal operation in accordance with the first embodiment of the present invention.

FIG. 3B is a time chart illustrating an example of the various control values of the fuel gas flow rate, oxidant gas flow rate, cooling water flow rate, stack voltage and stack current when a load demand is generated from the vehicle during fuel conservation operation, and fuel conservation operation is shut down.

As shown in FIG. 3B, at time t1, the fuel conservation operation mode is entered as is shown in FIG. 3A. At time t2b, when the power demand by the vehicle during fuel conservation operation exceeds the prescribed level, an instruction is generated corresponding to the load demand to feed fuel gas and oxidant gas at preset flow rates, or at flow rates higher by a prescribed ratio (for example, twice the preset flow rates) in order to reset in a shorter time, for a prescribed time (for example, the duration $\Delta t$ from time t2b to t3b being 1 sec). Then, at time t3b the normal power generation mode is entered, and drawing of a current corresponding to the desired load is started.

In both FIGS. 3A and 3B, in order to prevent a drop in the stack voltage due to insufficient fuel gas/oxidant gas when resetting from fuel conservation operation, the desired current is drawn after gases are fed to the two electrodes and the stack voltage exceeds a prescribed level (for example, a Vn of 0.88 V per cell). As a result, it is possible to increase the vehicle cruising distance while suppressing deterioration occurring when the fuel cell stack voltage is kept close to the open circuit voltage.

Next, the fuel conservation operation as controlled by controller 20 will be explained with reference to the control flow chart shown in FIG. 4. The symbols adopted in the flow chart are defined as follows.

Figure 4:
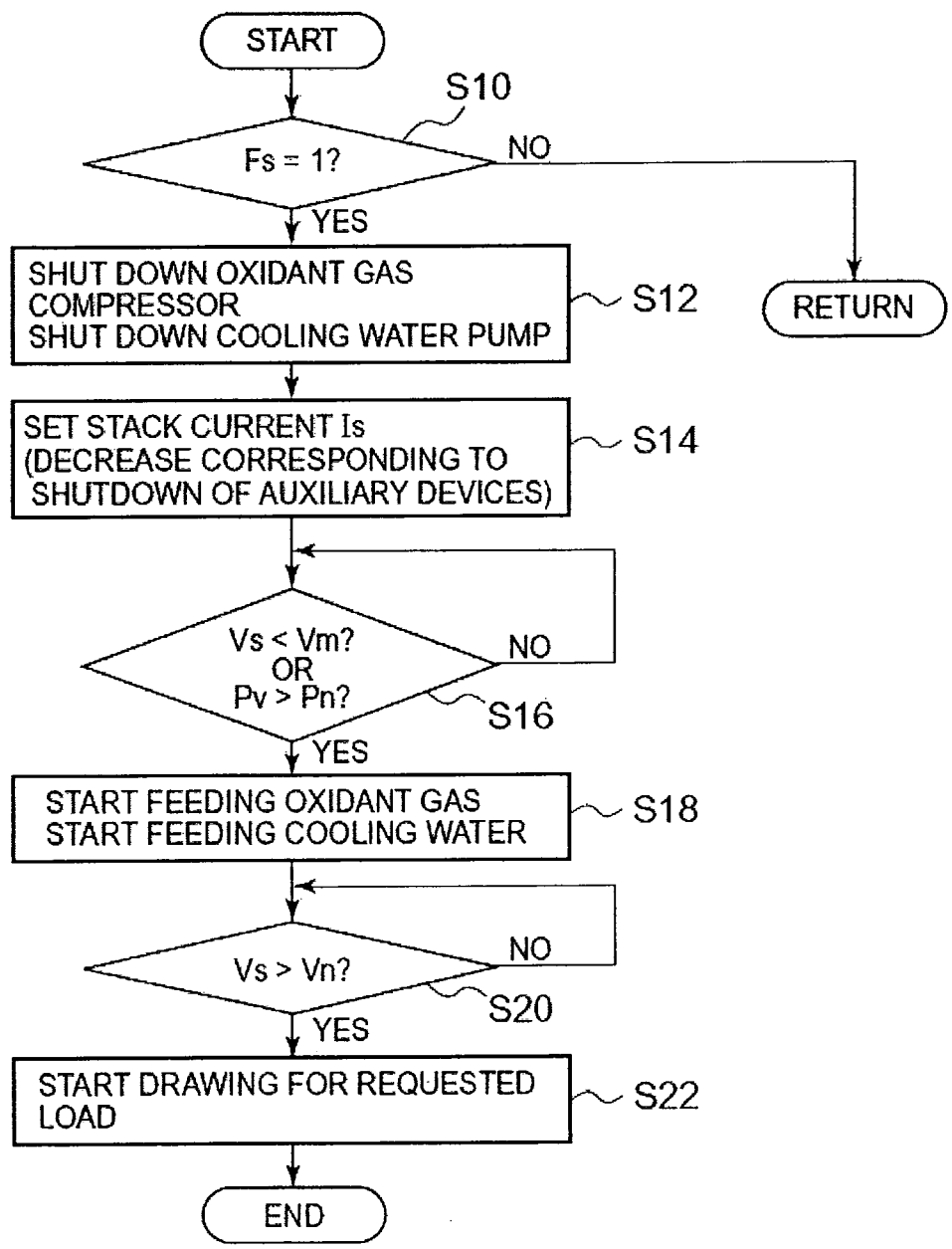
FIG. 4 is a flow chart illustrating an example of control operations performed by the first embodiment of the present invention.

Fs: fuel conservation operation permission flag
Pm: electric power at start of fuel conservation operation
Pn: electric power at end of fuel conservation operation
Pv: vehicle electric power demand
Vs: measured stack voltage
Vm: voltage at end of fuel conservation operation
Vn: current draw permission voltage
Vp: fuel conservation operation permission voltage
Is: stack current According to the flow chart shown in FIG. 4, in step S10, controller 20 judges whether said fuel conservation operation permission flag Fs is set to 1. If the fuel conservation operation permission flag Fs is not set to 1, flow returns without any further operations being performed. On the other hand, if it is determined in step S10 that the fuel conservation operation permission flag Fs is set to 1, flow proceeds to step S12. The fuel conservation operation permission flag Fs is set according to a judgment made by checking whether all of the conditions for permission for fuel conservation operation are met in a routine for judgment of the conditions for fuel conservation operation that is different from the flow chart shown in FIG. 4. If all the conditions are met, the flag is set to 1, and if not, the flag is set to 0.

Then, in step S12, controller 20 performs control to shut down oxidant gas compressor 5 and cooling water circulating pump 7, and fuel conservation operation is entered. At the same time, the operating output power of fuel gas circulating pump 4 can be decreased, and the flow rate of the fuel gas can be reduced. Then, in step S14 controller 20 sets stack current Is drawn from fuel cell stack 1. This stack current Is is set at a value lower than the current drawn from fuel cell stack 1 in the idle operation by an amount corresponding to the current consumption ($\Delta I$) of the auxiliary devices which have been shut down or have their operating output power cut.

Then, in step S16 controller 20 determines whether the measured stack voltage Vs of fuel cell stack 1 is lower than the prescribed voltage Vm at the end of fuel conservation operation, and whether vehicle demanded electric power Pv as the electric power needed by the vehicle is higher than the prescribed electric power Pn at the end of fuel conservation operation. If none of these conditions is met, S16 is repeated, and the fuel conservation operation continues to be performed. When the determination in step S16 indicates that stack voltage Vs is lower than voltage Vm at the end of fuel conservation operation (the case shown in FIG. 3A) or vehicle demanded electric power Pv is higher than electric power Pn at the end of fuel conservation operation (the case shown in FIG. 3B), flow proceeds to step S18.

In step S18, controller 20 starts oxidant gas compressor 5 in order to start feeding oxidant gas to fuel cell stack 1. Also, controller 20 starts cooling water circulating pump 7 in order to start circulation of the cooling water between fuel cell stack 1 and radiator 8. In this case, if the operating output power of fuel gas circulating pump 4 was reduced in step S12, controller 20 increases the operating output power of fuel gas circulating pump 4 in order to increase the flow rate of fuel gas circulation.

Then, in step S20 controller 20 judges whether stack voltage Vs detected by voltage sensor 15 is higher than the prescribed current draw permission voltage Vn. If stack voltage Vs is lower than current draw permission voltage Vn, detection of stack voltage Vs and the determination in S20 are repeated in a standby mode. On the other hand, if the determination in step S20 indicates that stack voltage Vs is higher than current draw permission voltage Vn, flow proceeds to step S22. In step S22, controller 20 instructs electric power controller 9 to start drawing the demanded load, and when electric power controller 9 starts drawing the demanded load, fuel conservation operation comes to an end.

In the first embodiment explained above, a current larger than zero is still drawn from the fuel cell stack even during the fuel conservation operation, and the total charge drawn per unit time is controlled to stay constant or substantially constant. Consequently, even when the current-voltage characteristics vary during the process of using the fuel cell stack, it is still possible to draw the desired current throughout the time period extending from a new stack to a deteriorated stack. As a result, it is possible to suppress deterioration caused by keeping the fuel cell stack voltage close to the open circuit voltage during fuel conservation operation. In addition, because the quantity of hydrogen consumed can be reduced, it is possible to execute fuel conservation operation for a longer time. As a result, it is possible to realize improvement in the durability of the fuel cell stack.

In this first embodiment, the stack current remains constant or substantially constant over time during fuel conservation operation. Consequently, the cell voltage falls monotonically, and it is possible to suppress up/down variations in the cell voltage. As a result, it is possible to realize further improvement in the durability of the fuel cell stack. In addition, because it is easy to determine the consumption of reaction gas at the fuel electrode and in the pipes, there is little or no waste in the consumption of gas throughout the period from beginning to end of fuel conservation operation, and it is possible to execute fuel conservation operation for a longer time.

According to this embodiment, when the voltage falls lower than the prescribed level during fuel conservation operation, the mode is reset to the idle operation. Consequently, it is possible to suppress deterioration in the resetting response caused by a cutoff of gas at least at the fuel electrode and the oxidant electrode during the fuel conservation operation.

Also, according to this first embodiment, when the prescribed voltage is not reached during fuel conservation operation, oxidant gas is fed to the oxidant electrode. Consequently, instead of fully resetting from fuel conservation operation to the idle operation, it is possible to perform fuel conservation operation for a longer time. Consequently, it is possible to improve the durability of the fuel cell stack during the fuel conservation operation that guarantees the supply surplus rate (stoichiometric ratio SR) of the fuel gas, and it is possible to realize the effect of long-term execution of fuel conservation operation.

In addition, according to this embodiment, the value of the current drawn from the fuel cell stack during fuel conservation operation is set lower than the stack current value in idle operation by an amount corresponding to the current not drawn from the fuel cell stack for the auxiliary devices that are shut down during fuel conservation operation. Consequently, it is possible to suppress the high voltage deterioration of the fuel cell stack during fuel conservation operation, and it is possible to conserve energy by an amount corresponding to the output power for the auxiliary devices that are shut down in this case. Hence, it is possible to realize improvement of the durability of the fuel cell stack and zero variation in the overall power generation/consumption balance of the fuel cell system.

Second Embodiment

A second embodiment of the fuel cell system of the present invention will be explained. The constitution of the fuel cell system in this second embodiment is the same as that in the first embodiment as shown in FIG. 2. However, unlike the first embodiment in which stack current Is drawn from fuel cell stack 1 is reduced immediately after the start of the fuel conservation operation, in this second embodiment, a current equal to the stack current in idle operation is drawn during a certain period after shutdown of the auxiliary devices, and control is performed so that the stack voltage is quickly lowered. Another difference is that the current drawn curve has a sloping shape from the time of gas supply (when the voltage rises) in resetting to the idle operation. With the exception of what will be explained below, the second embodiment is essentially identical to the first embodiment.

Figure 5:
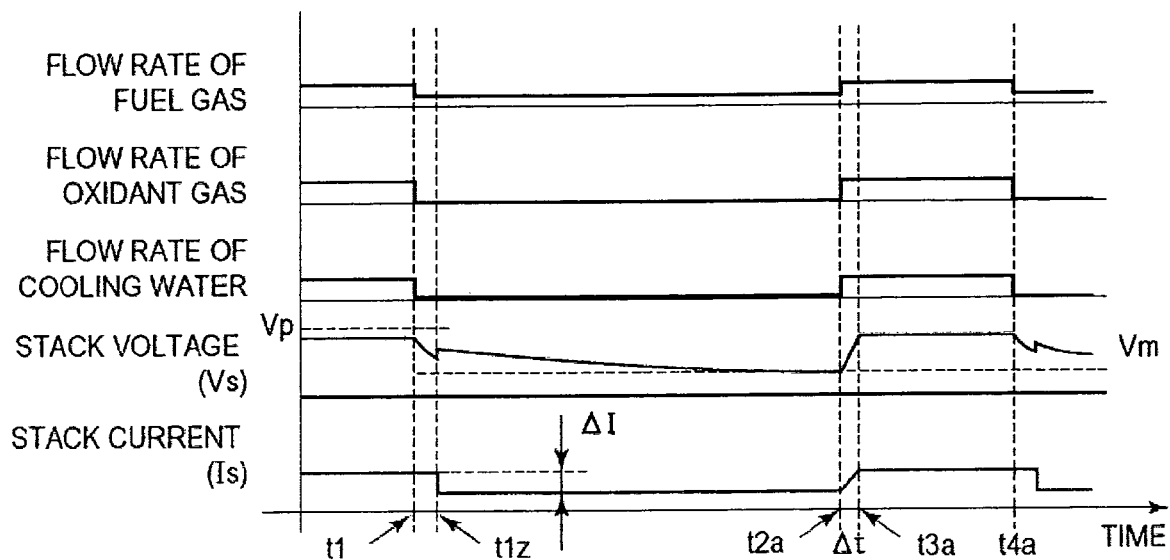
FIG. 5 is a timing chart illustrating an example of the variation over time of various control values in accordance with a second embodiment of the present invention.

FIG. 5 is a time chart illustrating an example of the various control values of the fuel gas flow rate, oxidant gas flow rate, cooling water flow rate, stack voltage, and stack current when the fuel conservation operation cycle is continued in this embodiment. As shown in FIG. 5, at time t1, after the start of fuel conservation operation preparation, the auxiliary devices for the operation of fuel cell stack 1, such as oxidant gas compressor 5 and cooling water circulating pump 7, are shut down. Also, stack current Is is set such that even when the fuel cell stack current is reduced by a value corresponding the power consumption of the auxiliary devices that are now shut down, the fuel cell stack voltage still does not exceed the idle voltage. This current setting may be performed in stepwise form or gradually. FIG. 5 shows an example of the stepwise form of this current setting. In this case, the stack current in idle operation continues until the fuel cell stack voltage becomes lower than fuel conservation operation permission voltage Vp.

As a result, at time t1z when the fuel conservation operation is started, the voltage of fuel cell stack 1 does not rise to near the open circuit voltage. Consequently, it is possible to further enhance the effect of durability improvement realized in the first embodiment.

Then, because the oxidant gas is consumed over time, the voltage of fuel cell stack 1 gradually falls. At time t2a, when the voltage of fuel cell stack 1 has fallen to a prescribed voltage (for example, Vm is 0.75 V for each cell), the flow rates of the fuel gas and the oxidant gas are increased, and the conventional idle operation is reestablished.

In order to improve the response when resetting from fuel conservation operation to idle operation, the fuel gas and oxidant gas are fed for a prescribed time (for example, the duration Δt from time t2a to t3a being 1 sec) at the preset flow rates for idle operation or at flow rates higher than that by a prescribed ratio (for example, twice the preset flow rates) in order to reset in a shorter time. FIG. 5 further includes a diagram illustrating the preset gas flow rates in the idle operation. When the gases are fed in this case, the voltage of fuel cell stack 1 is monitored, the stack current value is set such that the voltage does not exceed the idle voltage, and operation is reset to the conventional idle operation. The stack current setting may be performed in stepwise form or gradually. FIG. 5 also shows an example in which setting is performed gradually. In this case, the stack current makes a gradual transition to the idle current such that the stack voltage does not exceed the idle voltage. In this case, while rising of the voltage beyond the idle voltage during gas feeding is suppressed, insufficient gas supply due to excessive current draw also can be suppressed, so that it is possible to further reduce deterioration of the fuel cell.

Similarly, the aforementioned method may also be adopted when the electric power Pv demanded by the vehicle during fuel conservation operation exceeds the prescribed level. As a result, the voltage of fuel cell stack 1 at the start of fuel conservation operation does not rise to near the open circuit voltage, so that it is possible to further enhance the effect of durability improvement achieved in the first embodiment.

Figure 6:
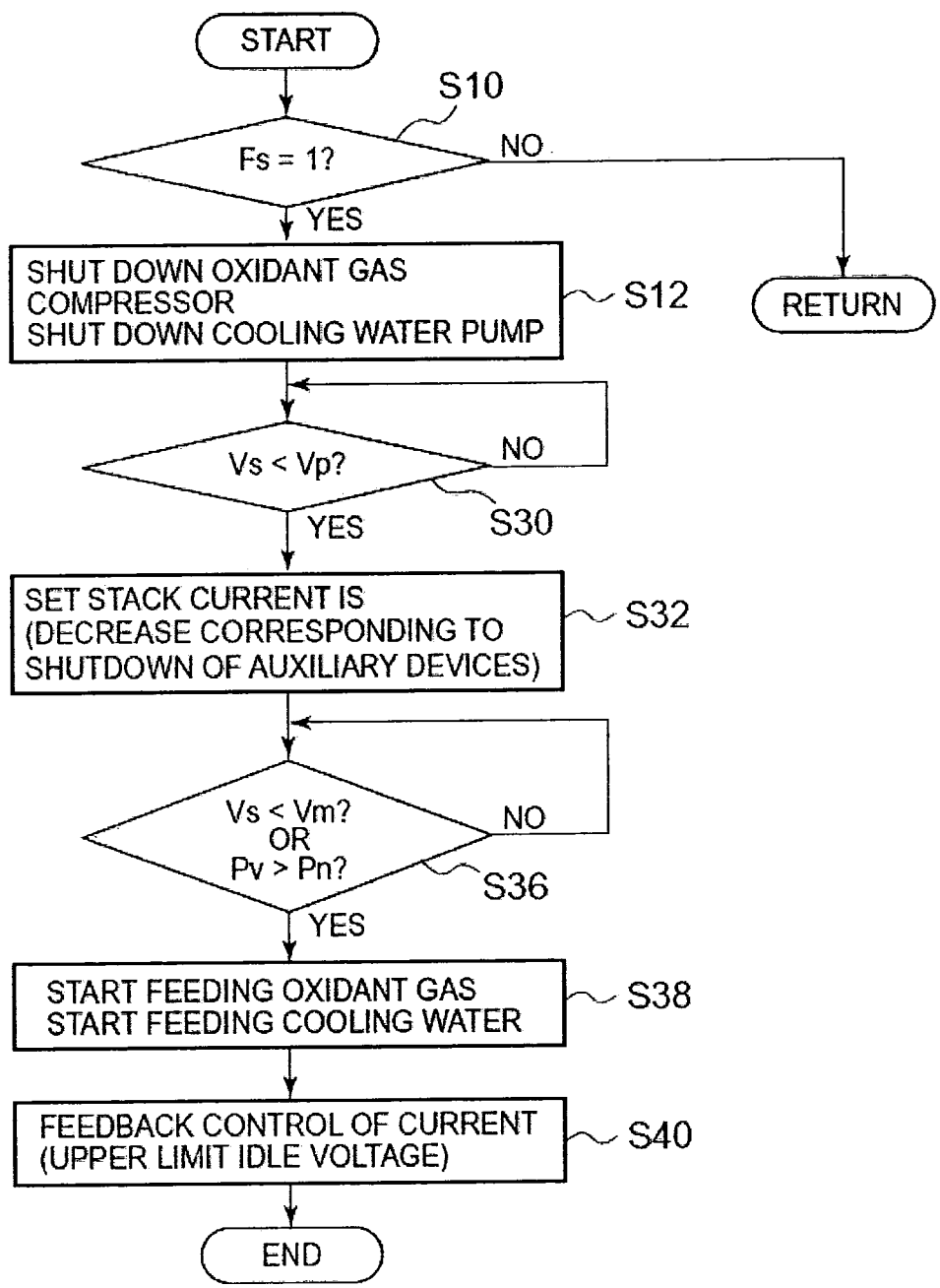
FIG. 6 is a flow chart illustrating an example of control operations performed by the second embodiment of the present invention.

In the following, an example of the fuel conservation operation of controller 20 in this embodiment will be explained with reference to the flow chart shown in FIG. 6. As shown in FIG. 6, in step S10 controller 20 determines whether fuel conservation operation permission flag Fs is set to 1. If fuel conservation operation permission flag Fs is not set to 1, the process flow returns without further activity. On the other hand, if the determination in step S10 indicates that fuel conservation operation permission flag Fs is set to 1, flow proceeds to step S12.

In step S12, controller 20 shuts down oxidant gas compressor 5 and cooling water circulating pump 7, and flow proceeds to the fuel conservation operation. At the same time, the operating output power of fuel gas circulating pump 4 can be decreased and the fuel gas flow rate be reduced. Then, in step S30, controller 20 measures voltage Vs of fuel cell stack 1 by means of voltage sensor 15, and judges whether stack voltage Vs is lower than the prescribed fuel conservation operation permission voltage Vp. If stack voltage Vs is over the fuel conservation operation permission voltage Vp, flow returns to the operation of measuring and judging the stack voltage in step S30. On the other hand, if the determination made in step S30 indicates that stack voltage Vs is lower than fuel conservation operation permission voltage Vp, flow proceeds to step S32.

In step S32, controller 20 sets stack current Is drawn from fuel cell stack 1 during fuel conservation operation. The stack current Is is set to be lower than the current drawn from fuel cell stack 1 in idle operation by a value corresponding to the current consumption (ΔI) of the auxiliary devices that are shut down or have their operating output cut.

Then in step S36, controller 20 judges whether stack voltage Vs as the measured value of the voltage of fuel cell stack 1 is lower than voltage Vm at the end of fuel conservation operation, and whether electric power Pv demanded by the vehicle is higher than the prescribed electric power Pn at the end of fuel conservation operation. When neither of these conditions is met, S36 is repeated, and fuel conservation operation is continued. On the other hand, if the determination in step S36 indicates that stack voltage Vs is lower than voltage Vm at the end of fuel conservation operation, or that electric power Pv demanded by the vehicle is higher than electric power Pn at the end of fuel conservation operation, flow proceeds to step S38.

In step S38, controller 20 starts oxidant gas compressor 5 in order to start feeding oxidant gas to fuel cell stack 1. Controller 20 also starts cooling water circulating pump 7 in order to start cooling water circulation between fuel cell stack 1 and radiator 8. In this case, if the operating output power of fuel gas circulating pump 4 is decreased in step S12, controller 20 increases the operating output power of fuel gas circulating pump 4 and increases the circulation flow rate of the fuel gas. Then, in step S40 controller 20 performs feedback control of the magnitude of stack current Is drawn from fuel cell stack 1 such that fuel cell stack voltage Vs detected by voltage sensor 15 does not exceed the upper limit idle voltage pre-stored as the fuel cell stack voltage in idle operation.

As explained above, according to this second embodiment, when there is a shift to fuel conservation operation, setting of the stack current in fuel conservation operation is delayed after shutdown of the auxiliary devices so that the stack voltage does not exceed the voltage for idle operation. Consequently, in addition to the effect of the first embodiment, when the generated current value in transition to fuel conservation operation is low, the cell voltage does not rise to near the open circuit voltage, and it is possible to prevent deterioration of the stack.

In addition, according to this embodiment, when resetting from fuel conservation operation to normal operation is done, the fuel cell stack current value is set such that the fuel cell stack voltage does not exceed the maximum value for normal operation. Consequently, when the generated current value is low during fuel conservation operation, it is possible when resetting to idle operation or normal operation to prevent a rise of the cell voltage to near the open circuit voltage, and to prevent deterioration of the stack.

Third Embodiment

A third embodiment of the fuel cell system of the present invention will now be explained. The fuel cell system in this embodiment is similar to that of the first embodiment shown in FIG. 2, except that a discharge device (e.g., discharge means) is provided (not shown in FIG. 2) that can be connected in parallel with fuel cell stack 1. Unlike the first embodiment, in which the residual charge of rechargeable battery 10 is not considered in setting the current drawn from fuel cell stack 1 in fuel conservation operation, in this third embodiment the value of the current drawn from fuel cell stack 1 in fuel conservation operation is set at larger value when the residual charge of rechargeable battery 10 is smaller. With the exception of what is explained in the following, this embodiment is substantially identical to the first embodiment.

Figure 7:
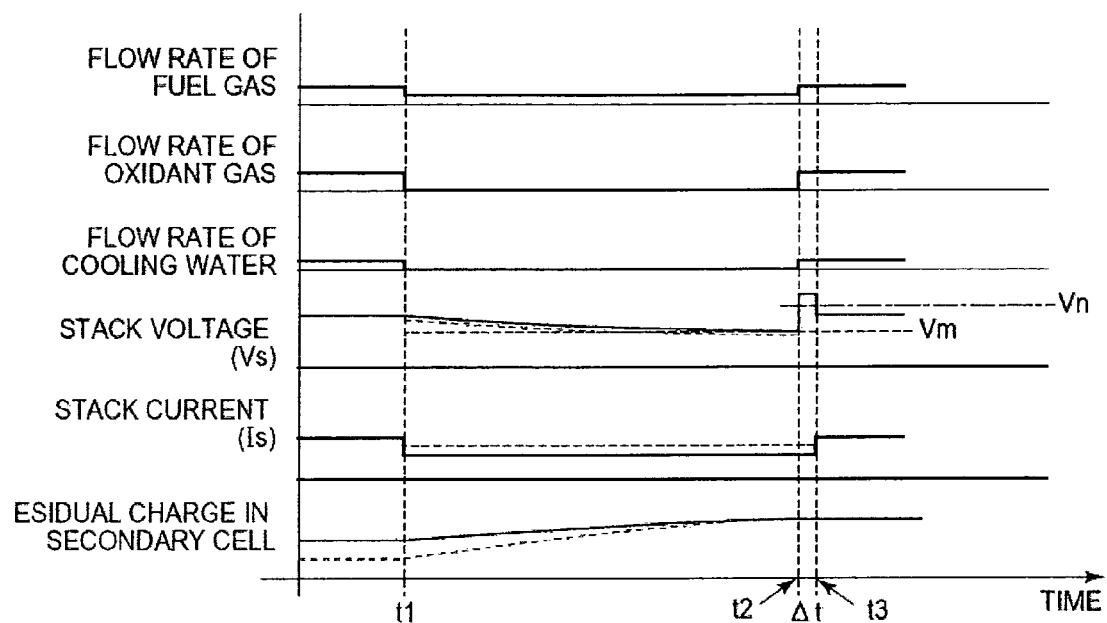
FIG. 7 is a timing chart illustrating an example of the variation over time of various control values in accordance with a third embodiment of the present invention.

FIG. 7 is a time chart illustrating an example of the various control values of the fuel gas flow rate, oxidant gas flow rate, cooling water flow rate, stack voltage, and stack current when the fuel conservation operation cycle is continued. As shown in FIG. 7, at time t1, when the fuel conservation operation is started, the auxiliary devices for operation of fuel cell stack 1, such as oxidant gas compressor 5 and cooling water circulating pump 7, are shut down. Then, after time t1 when the fuel conservation operation is started, the current drawn from fuel cell stack 1 is controlled by electric power controller 9 such that the total charge per unit time becomes constant or substantially constant. Also, the current value for charging rechargeable battery 10 is set at a value that is larger when the residual charge of rechargeable battery 10 detected by residual charge monitor 10a is smaller. In this example, the broken line in FIG. 7 indicates that case when the residual charge of rechargeable battery 10 is small.

Figure 9:
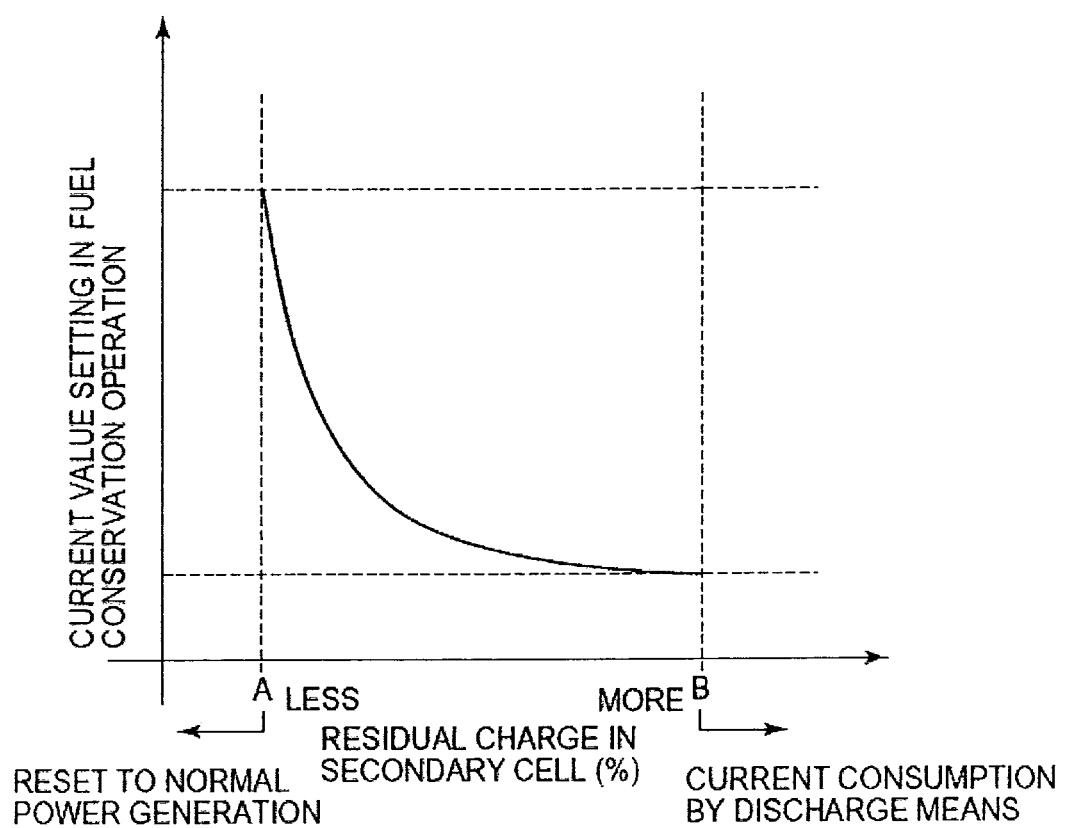
FIG. 9 is a diagram illustrating an example of setting the stack current in accordance with the third embodiment of the present invention.

FIG. 9 is a diagram illustrating an example of setting the value for current drawn from fuel cell stack 1 in the fuel conservation operation. In the range where the residual charge of rechargeable battery 10 is from A % to B % of that in the fully charged state, the stack current value in fuel conservation operation is set larger when the residual charge of the rechargeable battery is smaller. When the residual charge is less than A %, normal power generation is reestablished, and rechargeable battery 10 is quickly charged. When the residual charge exceeds B %, the rechargeable battery is not charged in order to avoid overcharging, and discharge by the discharge device is performed under control. The values of A, B are selected appropriately according to the capacity of the rechargeable battery and the features of the vehicle carrying the fuel cell system, such as whether a rechargeable battery running mode is provided.

The current value shown in FIG. 9 is pre-stored in controller 20 as a control map. The current value stored in the control map may be set such that there is no drastic drop in the voltage of fuel cell stack 1 caused by non-supply of oxidant gas and cooling water. As a result, it is possible even during fuel conservation operation to perform charging more quickly when the residual charge of rechargeable battery 10 is smaller in fuel conservation operation, too.

The following is an example in which the kinetic energy of the vehicle is recovered by the vehicle as regenerated electric energy. In order for the regenerated energy to be efficiently recaptured by rechargeable battery 10, the current setting for current drawn from fuel cell stack 1 during fuel conservation operation is skipped according to the residual charge of the rechargeable battery. Control is then performed such that current flows into a discharge device (not shown in the figure) that can be connected in parallel with fuel cell stack 1, and the total charge per unit time becomes constant or substantially constant. In this case, when the residual charge in the rechargeable battery detected by residual charge monitor 10a during fuel conservation operation is below a prescribed level (such as 60% of that at full charge), the current drawn from fuel cell stack 1 is once again switched from the discharge device to rechargeable battery 10.

Figure 8:
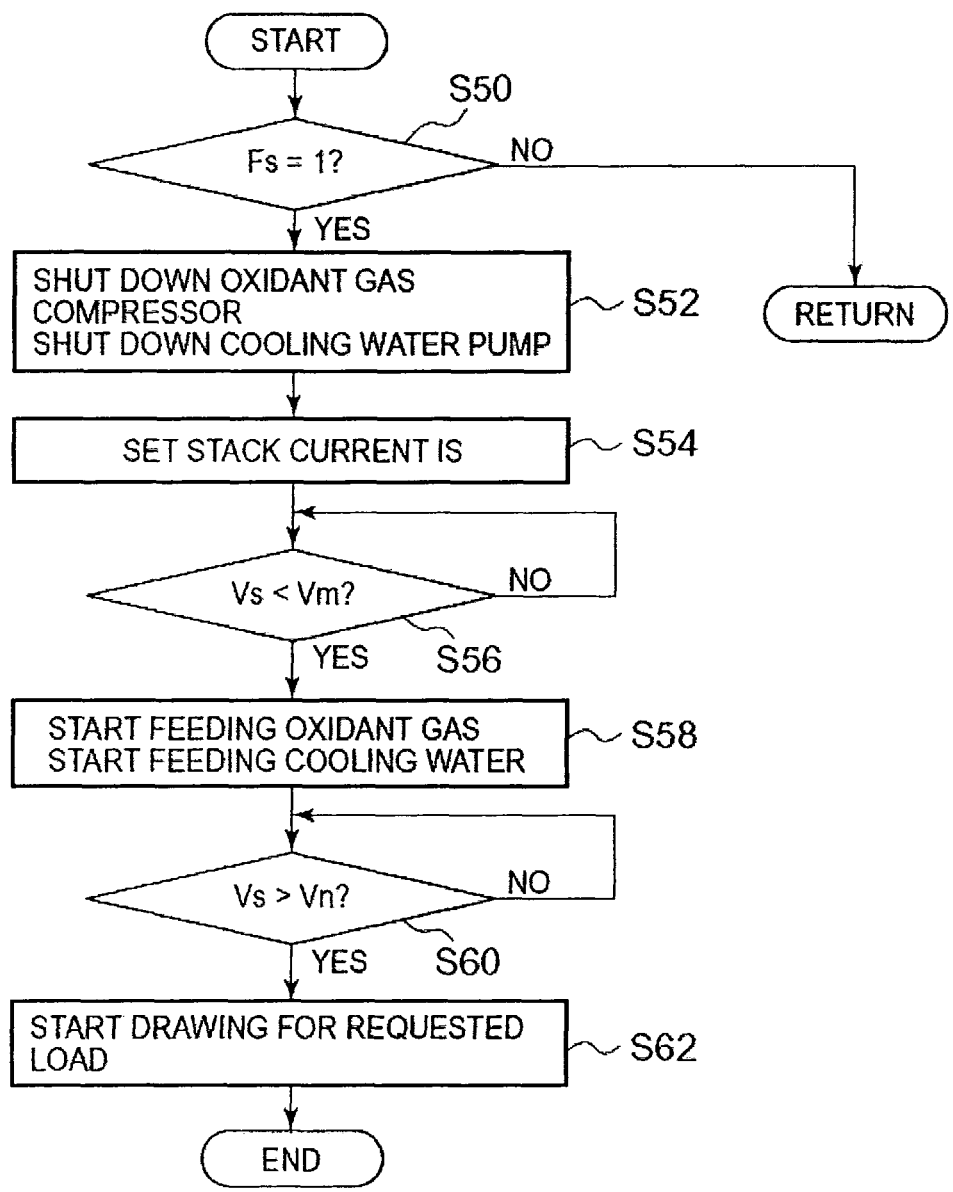
FIG. 8 is a flow chart illustrating an example of control operations performed by the third embodiment of the present invention.

In the following, an example of the fuel conservation operation control by controller 20 in the present embodiment will be explained with reference to the control flow chart shown in FIG. 8. As shown in FIG. 8, in step S50 controller 20 judges whether fuel conservation operation permission flag Fs is set to 1. If fuel conservation operation permission flag Fs is not set at 1, the flow returns without further activity. On the other hand, if the judgment in step S50 indicates that fuel conservation operation permission flag Fs is set at 1, flow proceeds to step S52.

In step S52, controller 20 shuts down oxidant gas compressor 5 and cooling water circulating pump 7, and fuel conservation operation is begun. The operating output power of fuel gas circulating pump 4 can be lowered at the same time to reduce the flow rate of the fuel gas.

Then, in step S54 controller 20 sets stack current Is drawn from fuel cell stack 1 in the fuel conservation operation. With reference to the control map shown in FIG. 9, the stack current Is is set at a larger value when the residual charge of rechargeable battery 10 detected by residual charge monitor 10a is smaller.

Then, in step S56 controller 20 judges whether stack voltage Vs as the measured value of the voltage of fuel cell stack 1 is below the prescribed voltage Vm at the end of fuel conservation operation. If this condition is not met, flow returns to step S56, and fuel conservation operation is continued. On the other hand, if the judgment in step S56 indicates that stack voltage Vs is lower than voltage Vm at the end of fuel conservation operation, flow proceeds to step S58.

In step S58, controller 20 starts oxidant gas compressor 5 to start feeding of the oxidant gas to fuel cell stack 1. Controller 20 also starts cooling water circulating pump 7 to start the cooling water circulation between fuel cell stack 1 and radiator 8. In this case, if the operating output power of fuel gas circulating pump 4 was lowered in step S52, controller 20 increases the operating output power of fuel gas circulating pump 4 to increase the circulation flow rate of the fuel gas.

Then, in step S60 controller 20 judges whether fuel cell stack voltage Vs detected by voltage sensor 15 is higher than the prescribed current draw permission voltage Vn. If stack voltage Vs is lower than current draw permission voltage Vn, detection and judgment of fuel cell stack voltage Vs in step S60 are repeated in a standby state. If the determination in step S60 indicates that fuel cell stack voltage Vs is higher than current draw permission voltage Vn, flow proceeds to step S62. In step S62, controller 20 instructs electric power controller 9 to start drawing the demanded load, and fuel conservation operation comes to an end when electric power controller 9 starts drawing the demanded load.

According to this third embodiment explained above, the value of the current drawn from the fuel cell stack during fuel conservation operation is set at a larger value when the residual charge in the rechargeable battery is smaller. Consequently, while the high voltage deterioration is suppressed during fuel conservation operation, it is possible to have a high rechargeable battery charging current. Hence, it is possible to realize the effects of improving the durability of the fuel cell stack and charging the rechargeable battery more quickly.

According to this embodiment, when the residual charge of the rechargeable battery exceeds a prescribed level, a discharge device that can be connected in parallel with the fuel cell stack is used to draw the stack current during fuel conservation operation. Consequently, while high voltage deterioration can be suppressed during fuel conservation operation, it is possible to prevent overcharging of the rechargeable battery.

In addition, according to this present embodiment, when the energy regeneration device charges the rechargeable battery during fuel conservation operation, a discharge device that can be connected in parallel with the fuel cell stack is used to fetch the stack current during fuel conservation operation. Consequently, while high voltage deterioration is suppressed during fuel conservation operation, it is possible to prevent overcharging of the rechargeable battery during energy regeneration.

Fourth Embodiment

A fourth embodiment of the fuel cell system of the present invention will now be explained. In addition to the components of the first embodiment shown in FIG. 2, the fuel cell system in this fourth embodiment 4 also has a temperature sensor 14 (e.g., stack temperature detecting means) that detects the temperature of fuel cell stack 1, a fuel gas pressure detecting device that detects the fuel gas pressure of fuel cell stack 1, and an oxidant gas pressure detecting device that detects the oxidant gas pressure of fuel cell stack 1. In addition, in this embodiment, while voltage sensor 15 detects the stack voltage as the total voltage of fuel cell stack 1, it also acts as a cell voltage detecting device that detects the cell voltages of at least two cells in the fuel cell stack.

Also, the setting value for stack current Is drawn from fuel cell stack 1 during fuel conservation operation is corrected according to the stack temperature, fuel gas pressure, and oxidant gas pressure. With the exception of what is explained in the following, the operation in the fourth embodiment 4 is essentially the same as that in the third embodiment.

Figure 10:
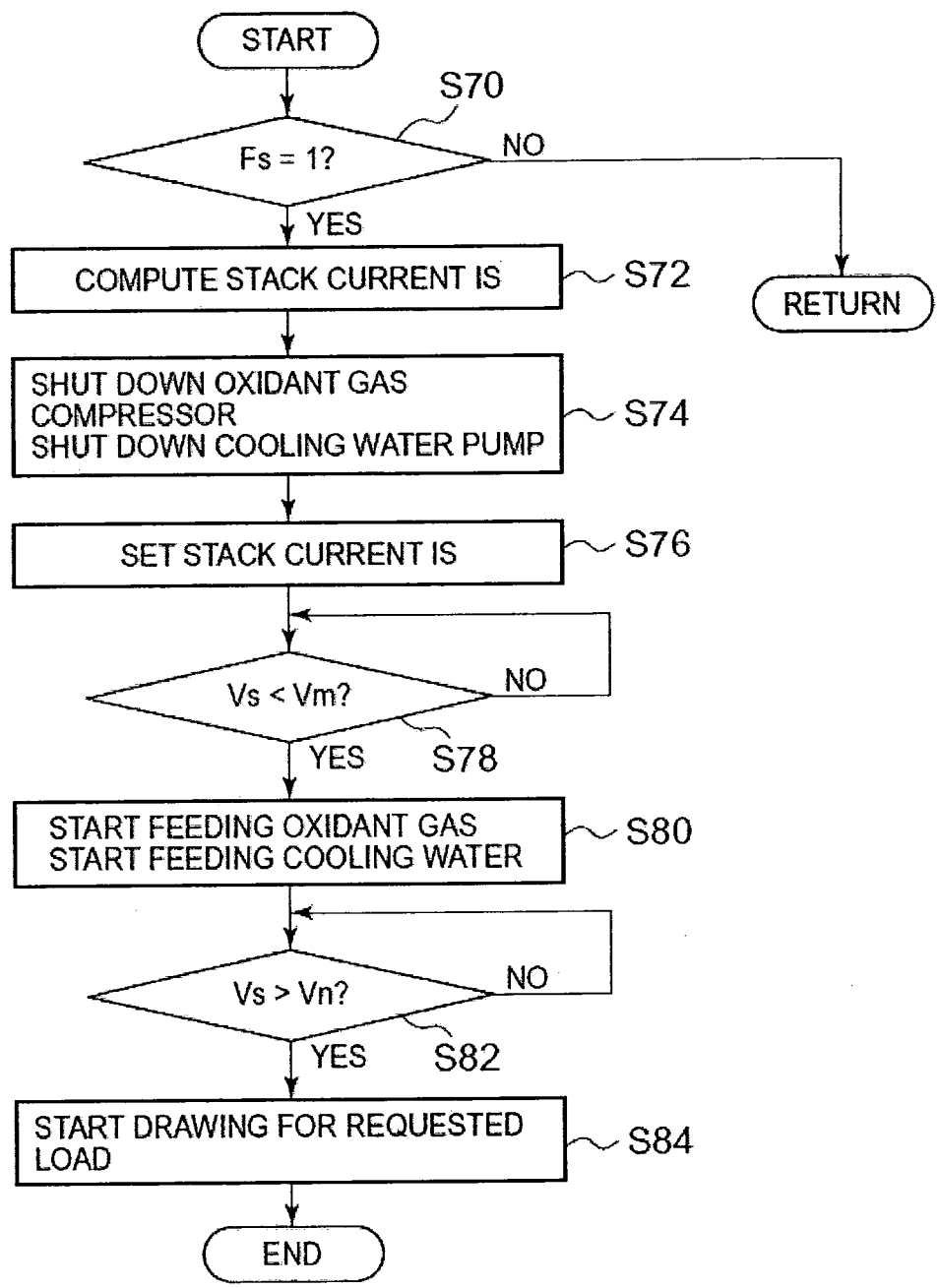
FIG. 10 is a flow chart illustrating an example of control operations performed by a fourth embodiment of the present invention.

In the following, an example of the operation of the fourth embodiment will be explained with reference to the control flow chart shown in FIG. 10. As shown in FIG. 10, in step S70, controller 20 judges whether fuel conservation operation permission flag Fs is set at 1. If fuel conservation operation permission flag Fs is not set to 1, flow returns as is. On the other hand, if the determination in step S70 indicates that fuel conservation operation permission flag Fs is set at 1, flow goes to step S72.

Figure 11A:
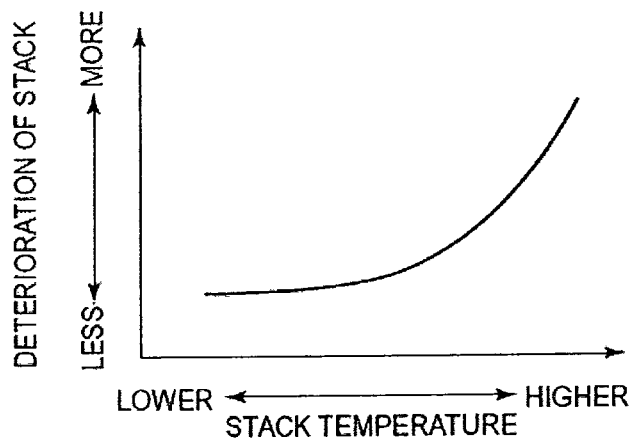
FIG. 11 is a diagram illustrating an example of the relationship between the internal state of the stack and stack deterioration.
Figure 11B:
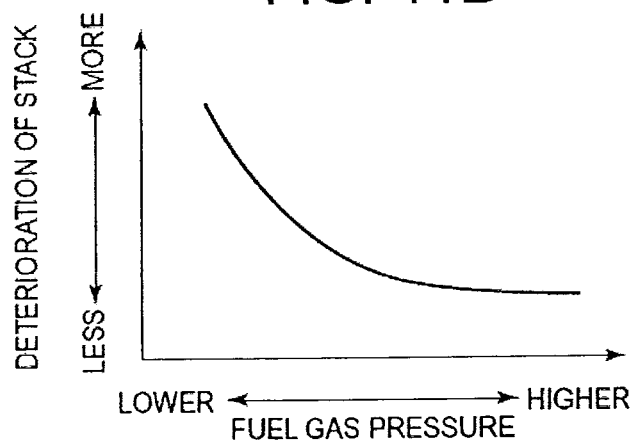
Figure 11C:
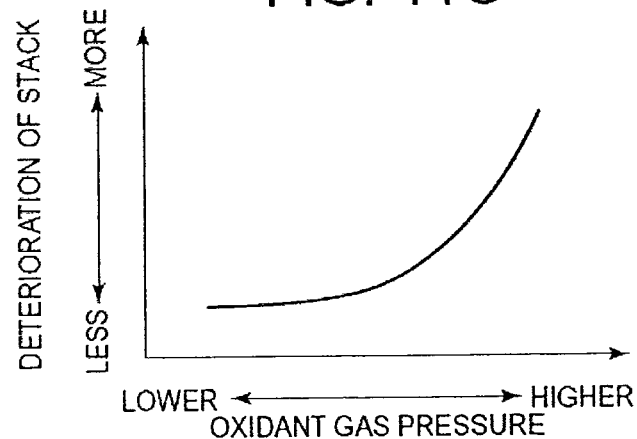
Figure 12A:
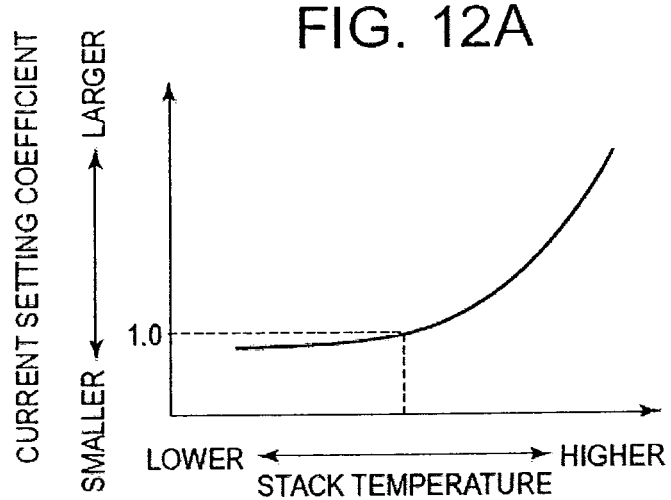
FIG. 12 is a diagram illustrating an example of the relationship between the internal state of the stack and the current setting.
Figure 12B:
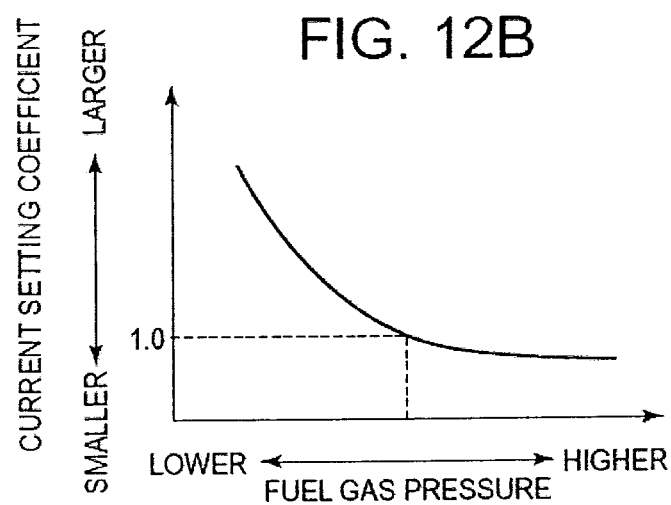
Figure 12C:
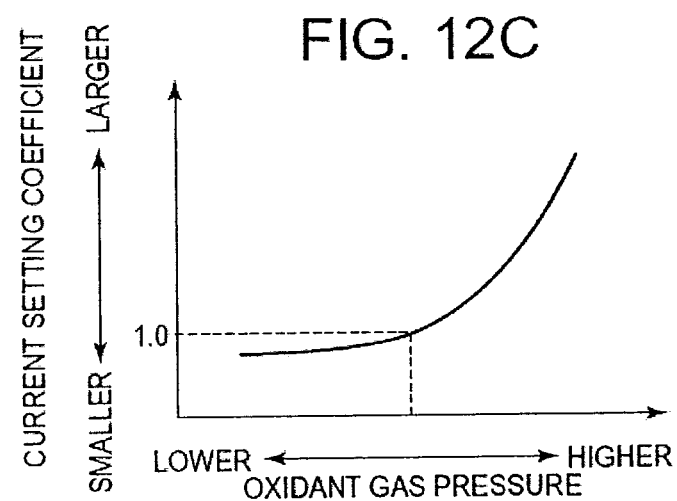

In step S72, controller 20 makes use of the stack temperature detecting device, fuel gas pressure detecting device and oxidant gas detecting device to read the stack temperature, fuel gas pressure, and oxidant gas pressure, respectively, immediately before the start of fuel conservation operation. The value for current drawn from fuel cell stack 1 during fuel conservation operation is computed based on said values. The current setting coefficient with respect to the stack temperature shown in FIG. 12A, the current setting coefficient with respect to the fuel gas pressure shown in FIG. 12B, and the current setting coefficient with respect to the oxidant gas pressure shown in FIG. 12C are used in this computing. These current setting coefficients are set based on the deterioration tendencies of the stack shown in FIGS. 1 and 11. From FIG. 1, it can be seen that stack deterioration occurring when the fuel cell stack voltage is nearer to the open circuit voltage tends to be suppressed when the stack current value is larger during fuel conservation operation. Also, from FIG. 11, it can be seen that there are tendencies to stack deterioration that can be suppressed. Based on this, as shown in FIGS. 12A-12C, the current setting coefficient is set larger when the stack temperature immediately before the start of fuel conservation operation is set lower, the fuel gas pressure is set higher, and the oxidant gas pressure is set lower. As further shown in FIGS. 12A-12C, the reference values of the stack temperature, of the fuel gas pressure, and of the oxidant gas pressure corresponding to each current setting coefficient of 1.0, the shapes of the curves of the various current setting coefficients are selected based on experiments performed beforehand, and they are pre-stored in controller 20.

In addition, in step S72 a correction is performed when the result of computing of stack current value is larger than the idle current value. More particularly, the minimum value of the cell voltage, measured using voltage sensor 15 arranged in each unit cell of fuel cell stack 1, immediately before fuel conservation operation is corrected to enable preventing the value from becoming the fuel gas insufficiency judgment voltage value (for example, −0.5 V) by drawing said set current from fuel cell stack 1 during fuel conservation operation.

Figure 13:
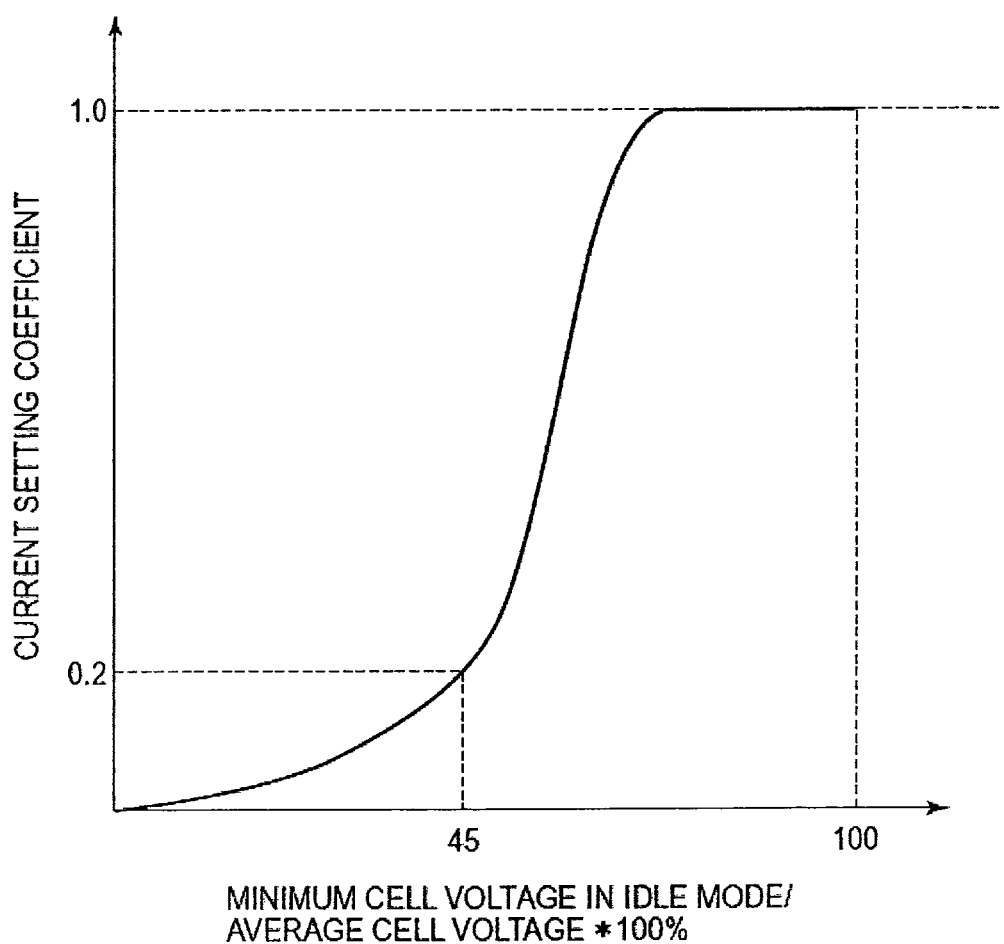
FIG. 13 is a diagram illustrating an example of the relationship between the stack voltage and the current setting coefficient in an idle operation performed the fourth embodiment of the present invention.

Also, the correction be performed based on experiments performed beforehand. For example, as shown in FIG. 13, when the lowest value of the cell voltage measured in idle operation immediately before fuel conservation operation is equal to 45% of the average cell voltage in fuel cell stack 1, the result obtained by correction with the current setting coefficient shown in FIG. 12 is multiplied by a correction coefficient of 0.2. The current setting coefficient has a smaller value when the deviation of the average cell voltage is larger. As a result, it is possible to set an appropriate stack current value corresponding to the internal state of the stack during fuel conservation operation.

Then, in step S74 controller 20 shuts down oxidant gas compressor 5 and cooling water circulating pump 7, and fuel conservation operation is begun. At the same time, it is preferred that the operating output power of fuel gas circulating pump 4 be lowered, and the fuel gas flow rate be reduced.

Then, in step S76 controller 20 sets stack current Is drawn from fuel cell stack 1 during fuel conservation operation. This stack current Is has the value computed in step S72.

Then, in step S78 controller 20 judges whether stack voltage Vs as the voltage measurement value for fuel cell stack 1 is lower than the prescribed voltage Vm at the end of fuel conservation operation. If this condition is not met, step S78 is repeated, and fuel conservation operation is continued. On the other hand, if the determination in step S78 indicates that stack voltage Vs is lower than voltage Vm at the end of fuel conservation operation, flow proceeds to step S80.

In step S80, controller 20 starts oxidant gas compressor 5 to start feeding of the oxidant gas to fuel cell stack 1. Controller 20 also starts cooling water circulating pump 7 to start the circulation of cooling water between fuel cell stack 1 and radiator 8. In this case, if the operating output power of fuel gas circulating pump 4 was reduced in step S74, controller 20 increases the operating output power of fuel gas circulating pump 4 so that the circulation flow rate of the fuel gas is increased.

Then, in step S82 controller 20 judges whether fuel cell stack voltage Vs detected by voltage sensor 15 exceeds the prescribed current draw permission voltage Vn. If the fuel cell stack voltage Vs is lower than said current draw permission voltage Vn, the detection and judgment of fuel cell stack voltage Vs in step S82 are repeated in a standby state. On the other hand, when the determination in step S82 indicates that fuel cell stack voltage Vs exceeds current draw permission voltage Vn, flow proceeds to step S84. In step S84, controller 20 instructs electric power controller 9 to start drawing the demanded load, and fuel conservation operation comes to an end when electric power controller 9 starts drawing the demanded load.

As explained above, according to the embodiments of the present invention, oxidant gas is fed so that the voltage does not exceed the voltage during an idle operation. Consequently, it is possible to prevent deterioration of the stack when the value of generated current during fuel conservation operation is low, and the cell voltage rises to near the open circuit voltage due to feeding of the oxidant gas.

According to the embodiments of the present invention described herein, the value of current drawn from the stack during fuel conservation operation is corrected according to the stack temperature, fuel gas pressure and oxidant gas pressure immediately before fuel conservation operation. Consequently, it is possible to determine the current drawn according to the susceptibility of the stack to deterioration, so that it is possible to realize further improvement of fuel cell stack durability.

Also in these embodiments, when the value of the current drawn from the fuel cell stack during fuel conservation operation is higher than the idle current immediately after it, the current value is corrected such that the cell having the lowest value of the cell voltage does not reach the voltage at which the fuel gas is insufficient. Consequently, while high voltage deterioration is suppressed during fuel conservation operation, it is possible to suppress deterioration in the fuel electrode catalyst due to insufficient fuel gas resulting from a rise in the current value when the fuel electrode flow path is blocked during idle operation.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell system having a fuel cell stack that generates electric power by electrochemical reaction of reaction gases fed to the fuel electrode and oxidant electrode, the fuel cell system comprising:
a fuel gas feeding device that feeds fuel gas;
a plurality of auxiliary devices comprising:
an oxidant gas feeding device that feeds oxidant gas; and
a cooling water feeding device that feeds cooling water;
a control device programmed to perform the following fuel conservation operation:
when a load demanded of the fuel cell stack falls below a prescribed level,
shutting down the auxiliary devices;
drawing a current, having a substantially constant value greater than zero, from the fuel cell; and
causing the fuel gas feeding device to feed fuel gas to the fuel cell at a non-zero flow rate; and
a voltage detecting device that detects the voltage of said fuel cell stack,
wherein said control device resets operation from said fuel conservation operation to an idle operation when said voltage during said fuel conservation operation is lower than a prescribed level,
wherein the idle operation comprises:
turning on the auxiliary devices; and
increasing the flow rate of the fuel gas;
wherein when a transition is made to said fuel conservation operation, said control device delays setting the stack current for said fuel conservation operation until after the shutdown of said auxiliary devices so that said stack voltage does not exceed a voltage in said idle operation.

2. The fuel cell system of claim 1, further comprising:
a voltage detecting device that detects the voltage of said fuel cell stack; and
wherein said control device causes oxidant gas to be fed to the oxidant electrode using said oxidant gas feeding device when said voltage, during said fuel conservation operation, is lower than a prescribed level.

3. The fuel cell system of claim 1, wherein said control device sets the value of the current drawn from the fuel cell stack during said fuel conservation operation to have a value lower than the current value for the stack during idle operation by an amount equal to the current drawn by the auxiliary devices of the fuel cell stack when their operation is shut down during said fuel conservation operation.

4. The fuel cell system of claim 1, further comprising:
a rechargeable battery,
wherein said control device sets the current drawn from the fuel cell stack during said fuel conservation operation at a value that depends on the residual charge of said rechargeable battery, wherein the current is chosen based on a decreasing function of the residual charge.

5. The fuel cell system of claim 1, wherein said control device controls feeding of the oxidant gas such that the idle operation voltage is not exceeded.

6. The fuel cell system of claim 1, wherein when operation is reset from said fuel conservation operation to a normal operation, said control device sets the stack current value such that it does not exceed a maximum value in normal operation.

7. The fuel cell system of claim 1, further comprising:
a fuel cell stack temperature detecting device that detects the temperature of said fuel cell stack,
wherein said control device sets the value of the current drawn from the fuel cell stack during said fuel conservation operation to a value that depends on temperature of said fuel cell stack, wherein the value of the current is chosen based on an increasing function of temperature.

8. The fuel cell system of claim 1, wherein said control device sets the value of the current drawn from the fuel cell stack during said fuel conservation operation to a value that depends on the pressure of the fuel gas in the fuel cell, wherein the current is chosen based on a decreasing function of fuel gas pressure.

9. The fuel cell system of claim 1, wherein said control device sets the value of the current drawn from the fuel cell stack during said fuel conservation operation to a value that depends on the pressure of the oxidant gas in the fuel cell, wherein the current is chosen based on a increasing function of oxidant gas pressure.

10. The fuel cell system of claim 1, wherein:
said fuel cell stack has a cell voltage detecting device that detects the voltage of at least two cells; and
when the value of the current drawn from the fuel cell stack during said fuel conservation operation is larger than a predetermined idle current, said control device corrects the current value such that the cell having the smallest value of said cell voltage does not reach voltage for which there is insufficient fuel gas.

11. The fuel cell system of claim 1, further comprising:
a rechargeable battery; and
a discharge device connected in parallel with the fuel cell stack to create a stack current draw during fuel conservation operation,
wherein the control device is further configured to:
determine a residual charge of the rechargeable battery; and
cause current to flow through the discharge device when the residual charge of the rechargeable battery exceeds a prescribed value.

12. The fuel cell system of claim 1, further comprising:
a rechargeable battery;
an energy regeneration device; and
a discharge device connected in parallel with the fuel cell stack,
wherein the control device is further configured to cause current to flow through the discharge device when said energy regeneration device charges said rechargeable battery during said fuel conservation operation.

13. A method for operating a fuel cell system having a fuel cell stack that generates electric power by electrochemical reaction of reaction gases fed to the fuel electrode and oxidant electrode, the method comprising:
feeding fuel gas to the fuel cell stack;
feeding oxidant gas to the fuel cell stack; and
executing a fuel conservation operation, when the load demanded of the fuel cell stack falls below a prescribed level, the operation comprising:

shutting down the auxiliary devices comprising an oxidant gas feeding device and a cooling water feeding device;

drawing a current, having a value greater than zero, from the fuel cell; and causing the fuel gas feeding device to feed fuel gas to the fuel cell at a non-zero flow rate.

14. The method of claim 13, wherein said executing controls the value of the current drawn from the fuel cell stack during said fuel conservation operation to be substantially constant.

15. The method of claim 13, further comprising:

detecting a voltage of said fuel cell stack; and resetting operation from said fuel conservation operation to an idle operation when said voltage during said fuel conservation operation is lower than a prescribed level, wherein the idle operation comprises:

turning on the auxiliary devices; and increasing the flow rate of the fuel gas.

16. A fuel cell system which has a fuel cell stack that generates electric power by electrochemical reaction of reaction gases fed to the fuel electrode and oxidant electrode, the fuel cell system comprising:

means for feeding a fuel gas and an oxidant gas; and means for controlling the fuel cell system such that when the load demanded of the fuel cell stack falls below a prescribed level, a fuel conservation operation is executed, the operation comprising:

shutting down auxiliary devices including an oxidant gas feeding device and a cooling water feeding device;

drawing a current, having a substantial constant value greater than zero, from the fuel cell; and causing the fuel gas feeding device to feed fuel gas to the fuel cell at a non-zero flow rate.

17. The fuel cell system of claim 16, wherein said control means controls the value of the current drawn from the fuel cell stack during said fuel conservation operation to be substantially constant.

* * * * *